(12) United States Patent
Ching

(10) Patent No.: US 7,814,024 B2
(45) Date of Patent: Oct. 12, 2010

(54) MULTI-WAY TRANSACTIONS RELATED DATA EXCHANGE APPARATUS AND METHODS

(76) Inventor: Peter N. Ching, 23 Vassar Aisle, Irvine, CA (US) 92612

( * ) Notice: Subject to any disclaimer, the term of this patent is extended or adjusted under 35 U.S.C. 154(b) by 0 days.

(21) Appl. No.: 11/129,538

(22) Filed: May 13, 2005

(65) Prior Publication Data

US 2005/0273440 A1 Dec. 8, 2005

Related U.S. Application Data

(60) Provisional application No. 60/571,112, filed on May 14, 2004.

(51) Int. Cl.
*G06F 17/60* (2006.01)
(52) U.S. Cl. .............. 705/64; 705/50; 705/51
(58) Field of Classification Search .......... 705/64, 705/50, 51
See application file for complete search history.

(56) References Cited

U.S. PATENT DOCUMENTS

| | | | |
|---|---|---|---|
| 3,949,363 A | 4/1976 | Holm | |
| 4,211,919 A | 7/1980 | Ugon | |
| 4,701,601 A | 10/1987 | Francini | |
| 5,699,528 A | 12/1997 | Hogan | |
| 5,884,271 A | 3/1999 | Pitroda | |
| 5,889,888 A | 3/1999 | Marianetti, II et al. | |
| 5,953,419 A * | 9/1999 | Lohstroh et al. | 713/165 |
| 6,219,652 B1 * | 4/2001 | Carter et al. | 705/59 |
| 6,269,348 B1 | 7/2001 | Pare, Jr. et al. | |
| 6,446,092 B1 | 9/2002 | Sutter | |
| 6,493,464 B1 | 12/2002 | Hawkins et al. | |
| 6,516,996 B1 | 2/2003 | Hippelainen | |
| 6,533,168 B1 | 3/2003 | Ching | |
| 6,611,255 B2 | 8/2003 | Griffin et al. | |
| 6,615,194 B1 | 9/2003 | Deutsch et al. | |
| 6,701,192 B1 | 3/2004 | Herwig | |
| 6,775,670 B2 | 8/2004 | Bessette | |
| 6,826,535 B2 | 11/2004 | Wood et al. | |
| 7,580,613 B2 * | 8/2009 | Kato et al. | 386/95 |
| 2002/0184527 A1 | 12/2002 | Chun et al. | |
| 2005/0086068 A1 * | 4/2005 | Quigley et al. | 705/1 |
| 2005/0189416 A1 * | 9/2005 | Charrin | 235/440 |
| 2007/0113078 A1 * | 5/2007 | Witt et al. | 713/165 |
| 2007/0113104 A1 * | 5/2007 | Witt et al. | 713/193 |

FOREIGN PATENT DOCUMENTS

JP 2008242665 A * 10/2008

* cited by examiner

*Primary Examiner*—Pierre E Elisca
(74) *Attorney, Agent, or Firm*—Gazdzinski & Associates, PC

(57) ABSTRACT

Methods and apparatus for conducting electronic transactions such as commerce transactions or purchases and exchanging related information. In one aspect, a robust and integrated apparatus and associated method is provided whereby a purchaser can securely provide transaction data and/or information in an electronic format to another party such as a vendor. In one exemplary embodiment, the purchaser can authenticate his or her right to use the billing information contained therein to complete a purchase without actually having to disclose the billing information in a human readable format, thereby enabling the vendor to obtain and authenticate the purchaser's identity and billing information while still protecting the purchaser's privacy, and without requiring disclosure of the purchaser's billing information to the vendor's employees or any other parties. In another aspect, the vendor can provide information about the transaction in an electronic form that can be authenticated and verified for accuracy.

25 Claims, 7 Drawing Sheets

PHOENIX RESTAURANT
14310 CULVER DR., #F
IRVINE, CA 92604
PHONE: (949) 451-0086

| DATE: NOV. 22, 2004 | #GUEST | 2 |
| SERVER: WALTER | TABLE | 35 |
| BILL: 0095 | TIME | 07:55P |

| 1 FRESH SEABASS | 16.00 |
| 1 SLICED PRIME RIB | 9.95 |
| 2 HOUSE SALAD | 10.50 |

| | SUBTOTAL | 36.45 |
| | SALES TAX | 4.51 |

| TOTAL | 40.96 |

*FIG. 1*

MULTI-WAY TRANSACTIONS RELATED DATA EXCHANGE APPARATUS AND METHODS

PRIORITY AND RELATED APPLICATIONS

This application claims priority to U.S. Provisional Application No. 60/571,112 filed May 14, 2004 of the same title, which is incorporated herein by reference in its entirety. This application is related to co-pending U.S. application Ser. No. 10/368,123 filed Feb. 18, 2003 and entitled "Method and Apparatus for Computer-Readable Purchase Receipts Using Multi-Dimensional Bar Codes", and U.S. application Ser. No. 09/579,446 filed May 26, 2000 of the same title, now U.S. Pat. No. 6,533,168, both incorporated by reference herein in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Field of the Invention

The present invention discloses an improved system and method for exchanging information in electronic formats between buyers, sellers and other authorized parties.

2. Description Of Related Technology

In the course of transactions, buyers of goods and services ("Purchasers") and parties that sell to them ("Vendors"), typically exchange significant amounts of transaction specific data related to a discrete transaction such as, without limitation, billing information, payment amounts, Vendor name and address, date of transaction and a listing or listings of items transacted ("Specific Transaction Data"). In addition to Specific Transaction Data, additional data that is, e.g., related to or arises out of discrete transactions or prior or future transactions can also be exchanged. This information can include but not be limited to data about the Purchaser's buying preferences, participation in a buyer loyalty program or programs or purchase return history; the long term performance of an item or service transacted (for example, in the context of a transaction involving automobile repair services, an automobile service history or an update thereto) or other types of data (for example, in the case of a transaction involving healthcare or healthcare related services, relevant data such as a record of medical treatment received or medicine prescribed or dispensed or in the case of a proposed sale, information that is intended to assist the Purchaser in deciding whether or not to complete the transaction) (collectively "Information"). It is more common for Vendors and Purchasers to exchange Information in paper form and less common for Vendors and Purchasers to exchange Information in electronic form.

When Specific Transaction Data or Information is exchanged through manual methods (such as a Vendor hand-keying a Payment Card (as defined below) billing number into a Payment Card authorization terminal or a Vendor providing Specific Transaction Data to a Purchaser as printed information on a paper receipt), a heightened risk of errors introduced by the data entry process exists. In addition, manual data entry increases the time required to complete discrete transactions, thereby reducing both Vendor and Purchaser efficiency. Exchange of Specific Transaction Data or Information in electronic formats is one technique that is used in the art to reduce these errors and to increase efficiency in the transaction process. The availability of billing data in electronic formats provides Vendors with a number of significant advantages that include but are not limited to the capability to use semi-automated and automated data entry methods to improve the accuracy and speed of data capture, to facilitate faster transfer of data for internal and external use, to eliminate duplicative entry of transaction related data and to facilitate entry of data into non-transaction related systems (for example to enter customer information into tracking databases). For example, U.S. Pat. No. 6,826,535 to Wood, et al., discloses, inter alia, a method for reducing fraud and streamlining the insurance claim payment process in healthcare related transactions by using insurance eligibility and billing information stored on an integrated circuit or magnetic strip based "Smart Card" to enable service providers to determine whether the individual bearing the card is authorized to receive the requested services. As disclosed in the '535 patent, a patient seeking healthcare presents the Smart Card to a healthcare service provider who then uses information stored on the Smart Card to validate the patient's eligibility to receive the healthcare in question. A salient disadvantage of the '535 patent is that it does not provide a means whereby the patient, as Purchaser, can capture Specific Transaction Data or Information from the service provider, as Vendor. It should also be noted that a further disadvantage of the '535 patent is that it relies on integrated circuit or magnetic strip based Smart Cards which are limited both in terms of the amount of information they can store and, in the case of integrated circuit Smart Cards, by the limited availability of compatible data reading and writing devices in the U.S. market (thereby excluding more readily available portable data transport and storage mediums such as USB flash keys and Personal Digital Assistants).

Examples of technologies and techniques used to move Specific Transaction Data and Information in electronic formats from Purchasers to Vendors include magnetic strip based credit or debit cards (collectively "Payment Cards") including those described in U.S. Pat. No. 6,615,194 B1 to Deutsch et al.; Magnetic Ink Character Recognition ("MICR") formatted bank checks of the type referenced in U.S. Pat. No. 3,949,363 to Holm; integrated circuit based "Smart Cards" of the types described in U.S. Pat. No. 4,211,919 to Ugon and U.S. Pat. No. 4,701,601 to Francini et al. and "tokenless" transaction systems similar to the type disclosed in U.S. Pat. No. 6,269,348 B1 to Pare, Jr. et al., as well as RFID devices of the type now ubiquitous.

To the extent that these systems and technologies have been applied to generate capabilities to move Specific Transaction Data or Information from Vendors to Purchasers in electronic form, these capabilities have been limited and have not generally provided Purchasers with the same degree of access to electronic data afforded to Vendors. It is still very common for Vendors to provide only limited subsets of available Specific Transaction Data (primarily direct transaction data such as the Vendor's name, the date of the transaction, a list of the items or services transacted, the prices associated with the specific transaction and a transaction identifier number (collectively "Limited Transaction Data"). Typically, Vendors provide Limited Transaction Data to Purchasers in the form of printed paper receipts at the time the transaction ends (as shown in FIG. 1 which depicts the layout of an exemplary prior art paper receipt). To the extent Purchasers wish to obtain Specific Transaction Data or Information immediately after completing the transaction, typically, only Limited Transaction Data is available and then only in hard copy format (such as a paper receipt). In particular, in the case of Information, it is uncommon for Vendors to provide Purchasers with information at the time of the transaction in an electronic format. To the extent Purchasers wish to obtain Specific Transaction Data or Information but do not require it at the time of the transaction, depending on the method of payment utilized by the Purchaser (i.e., as long as the transaction involves a payment method other than cash and involves an Intermediary), Purchasers may also obtain access to the Limited Transaction Data via Internet download or mailed hardcopies from Vendors, Intermediaries, or via other networks and entities (collectively "Intermediary Downloads"). The transaction information available through Intermediary Downloads in such case is usually a further limited subset of the Limited Transaction Data; commonly, specific information about exactly what items or services were transacted is not available and instead a summary number representing the total value of the transaction is the only pricing information available. For the purposes of this teaching, this subset of Limited Transaction Data will be referred to as a "Limited Download". An example of this method is disclosed in U.S. Pat. No. 5,699,528 to Hogan, incorporated herein by reference in its entirety.

U.S. Pat. No. 6,775,670 to Bessette discloses, inter alia, a method for managing medical information in which a "mobile communications system" utilizes a unique identifier associated with an individual, and stored on an integrated circuit Smart Card, to retrieve medical records pertaining to that individual from a server located within a network system. The individual's identifier is linked to "pointers", also stored on the Smart Card, that identify the locations on the server at which the referenced individual's medical information can be found. A disadvantage of this system is that although provision is made to allow medical records to be located based on information contained on the Smart Card, the information stored on the Smart Card is insufficiently secured from disclosure to or use by unauthorized parties. Further, the '670 patent provides neither a means whereby the individual's information can be authenticated as being from a trusted provider of data, nor a means whereby the individual's information can be validated as being in the form in which it was originally issued (i.e., being free from error, truncation or modification).

U.S. Pat. No. 5,884,271 to Pitroda discloses, inter alia, a "universal electronic transaction card" which can accept transfers of transaction information from point of sale terminals in electronic form. A disadvantage of this system is that although the transaction information is captured in electronic form, no provision is made to allow users to verify the source of the data. Further, the invention of the '271 patent does not provide for a means to verify that the transaction information was not modified after its initial creation. Finally, the invention of the '271 patent provides neither a means to secure the recorded transaction information from unauthorized use or modification nor a means to make authorized annotations to the captured transaction information.

For purposes of substituting electronic transaction data records for paper records in the context of accounting, finance and audits (both private and government), both authentication that the receipt was issued by the Vendor purported to have identified the receipt and verification that the data contained in the electronic receipt has not been modified after creation are arguably necessary features. Certain unique features of cryptographic methods can be applied to characterize data in binary formats to achieve defined levels of certainty with results that are very useful in the context of this Invention. Examples of such cryptographic methods are well known to those of ordinary skill in the art and will be covered only in brief here.

For example, symmetric cryptography is a cryptographic method that uses a single numeric key to perform both encryption and decryption. In contrast, asymmetric cryptography or dual key cryptography of the general type taught by Whitfield Diffie and Martin Hellman is a form of encryption in which the encryption/decryption keys are numerical values that exist in matching pairs such that what one of the keys encrypts, only the matching key can decrypt.

In asymmetric cryptography, typically one key of the pair is kept secret (the "Private Key") and one key of the pair is disclosed to the public and identified as belonging to the party controlling the Private Key (the "Public Key"). Public Key Infrastructures ("PKI") use trusted directories of information about Public Keys and their issuers in conjunction with asymmetric cryptography to provide assurances to recipients of asymmetrically encrypted files that Public Keys, and by extension information secured via asymmetric cryptography methods employing said Public Keys, indeed correspond to expected and claimed Private Key holders.

Secure hash algorithms, such as the SHA-1, SHA-224, SHA-256, SHA-384 and SHA-512 algorithms described in the U.S. Government's Federal Information Processing Standards Publication 180-2 (as amended); Ron Rivest's MD-4 and MD-5 algorithms and the Snerfu family of message digest functions developed by Ralph Merkle are well known in the art as one-way hash functions that convert variable length binary input strings into fixed length binary output strings that are a condensed representation of the electronic data contained in the binary input string (a "Message Digest"). One-way hash algorithms can be used to create secure indicators of binary file data integrity in the sense that they are designed such that for a given Message Digest created by processing a binary file with a one-way hash algorithm, it is computationally infeasible to find a different binary file that, when processed with a one-way hash algorithm, will create a second Message Digest that is identical to the Message Digest created using the first binary file. Symmetric cryptography, asymmetric cryptography, one-way hash and PKI methodologies are well known in the art.

U.S. Pat. No. 6,516,996 B1 to Hippeläinen describes an application of PKI and asymmetric cryptography methodologies to the problem of providing authentication of receipts issued by Vendors to Purchasers. A disadvantage of this system is that the asymmetric encryption methodology employed by the disclosed invention is calculation intensive. This makes the invention less suitable for use when the capacity to support high volumes of transactions within a short period is required or when reduced computing power is available. Another disadvantage of the '996 patent is that the disclosed system does not provide for a means whereby the Purchaser can read or otherwise use the transaction data contained in the electronic receipt while the receipt is encrypted. Another disadvantage is that the '996 patent does not disclose a system whereby the Purchaser can access the discrete transaction information within a given record electronically while at the same time retaining the ability to verify the authenticity of the transaction receipt, because, as described in the '996 patent, the encryption alone is the guarantee of the authenticity of the electronic receipt, and yet, in order to read discrete transaction data within an electronic receipt, a Purchaser must decrypt the electronic receipt. Another disadvantage of the '996 patent is that it contemplates encryption of only purchase receipts, excluding the broader category of Information. Yet another disadvantage of the '996 patent is that it does not provide an integrated means whereby the Purchaser can securely pass billing Information in electronic form to the Vendor and then receive Information from the Vendor in electronic form.

Each of the prior art methods described above provides Vendors and Purchasers with less than optimal methods to share Specific Transaction Data and Information, capture Specific Transaction Data and Information, transport Specific Transaction Data and Information and upload Specific Transaction Data and Information into their own computers for use. What is needed is an integrated yet portable means and methodology whereby a Purchaser can, inter alia, securely provide Specific Transaction Data and Information in an electronic format to a Vendor; if necessary, authenticate his or her right to use the Specific Transaction Data to complete a purchase and receive the resulting Specific Transaction Data and Information related to that transaction in an electronic format. Ideally, such format can be easily read, transported and used, but at the same time can be authenticated as being issued by the specific Vendor involved in the transaction and validated as being in the form originally issued by the specific Vendor.

SUMMARY OF THE INVENTION

The present invention satisfies the foregoing needs by providing improved apparatus and methods for transaction data exchange.

In a first aspect of the invention, a robust and integrated apparatus and associated method is provided whereby a Purchaser can securely provide Specific Transaction Data and Information in an electronic format to a Vendor. In one exemplary embodiment, the Purchaser can authenticate his or her right to use the billing information contained therein to complete a purchase without actually having to disclose the billing information in a human readable format, thereby enabling the Vendor to obtain and authenticate the Purchaser's identity and billing information while still protecting the Purchaser's privacy and without requiring disclosure of the Purchaser's billing information to the Vendor's employees and unauthorized parties.

In a second aspect of the invention, apparatus and associated methods are provided whereby a Vendor can provide a Purchaser with Specific Transaction Data about a transaction (s) and/or additional Information related to that transaction. In one exemplary embodiment, the Data/Information is provided in a format that can be read and used by the Purchaser and other authorized parties with minimal manual entry of Information.

In a third aspect of the invention, apparatus and associated methods are provided whereby Vendors may provide Purchasers with Specific Transaction Data and Information. In one exemplary embodiment, the Specific Transaction Data and/or Information is provided in a format that provides the Purchaser and other parties subsequently accessing or using the Specific Transaction Data and Information with assurances that the electronic file containing the Specific Transaction Data and Information was created by a defined Vendor and is unmodified from the form originally issued by the defined Vendor (in one exemplary embodiment, allowing the electronic file to replace a paper hardcopy receipt as the permanent record of the transaction for purposes including but not limited to accounting, audit and tax reporting).

In a fourth aspect of the invention, apparatus and associated methods are provided whereby Vendors, Purchasers and other authorized users can securely exchange Specific Transaction Data and Information in electronic formats either at the time of the transaction or at some other mutually agreed time. In one representative application, a Purchaser will present billing information to the Vendor in an encrypted electronic file, the Vendor will use the presented billing information to complete a sale and then the Vendor will provide an encrypted electronic file containing Specific Transaction Data about the details of that transaction and optionally additional Information back to the Purchaser. In addition to providing only billing information required for a specific transaction, the Purchaser may optionally provide other relevant Information to the Vendor (for example past purchase Information or customer loyalty program identification Information).

In a fifth aspect of the invention, apparatus and associated methods are provided whereby an electronic data transfer hub (a "Hub") is connected to a device (e.g., a point of sale terminal or personal computer) to permit Vendors and Purchasers to exchange Specific Transaction Data and Information in multiple electronic formats.

In a sixth aspect of the invention, apparatus and associated methods are provided whereby a device (e.g., a Data Transfer Device) may be used to allow Purchasers to send and receive Specific Transaction Data and other Information to and from the aforementioned hub and to transport, communicate and annotate Specific Transaction Data and Information received from said Hub in a secure format on a single device that will include protections securing the Specific Transaction Data and Information stored on the Data Transfer Device against unauthorized use or disclosure.

In a seventh aspect of the invention, apparatus and associated methods are provided whereby a device such as a Data Transfer Device may be used to allow secure transfer of Information that is not related to a specific transaction.

In an eighth aspect of the invention, apparatus, an integrated multi-purpose means of securely transferring Information other than Specific Transaction Data between Vendors, Purchasers and other parties is disclosed.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same of similar system parts and/or method steps, and:

FIG. 1 is a depiction of a typical prior art paper based printed transaction receipt.

DETAILED DESCRIPTION OF THE INVENTION

Figure 2:
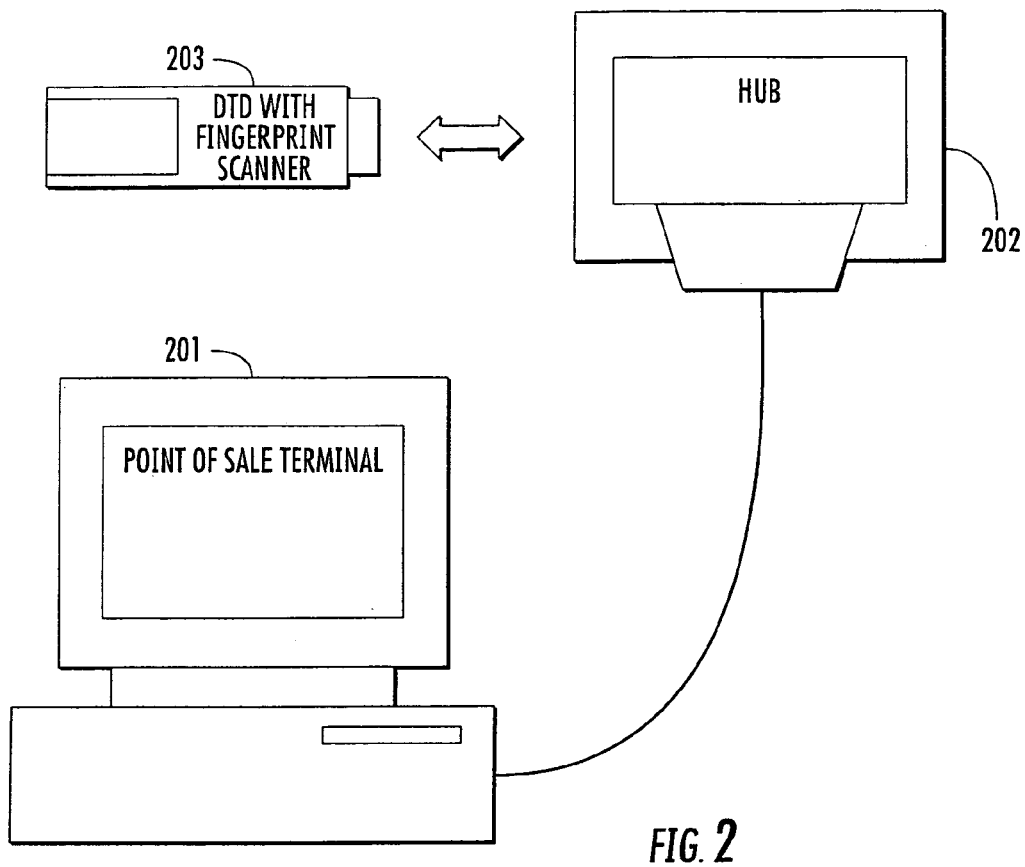
FIG. 2 is a diagram illustrating the basic components of an exemplary Vendor side configuration of a system conforming to the principles taught in the instant invention.

The following descriptions are exemplary embodiments of the invention and are not intended to limit the scope, applicability or configuration of the invention in any way. Rather, the following description is intended to provide convenient illustrations for implementing various embodiments of the invention. It will be appreciated by one skilled in the art that various additions, substitutions or deletions may be made in the function, arrangement and/or combination of the elements described in these embodiments (as well as the sequence and content of steps described herein) to ascertain and/or realize any number of other benefits without departing from the spirit and scope of the instant invention.

It will also be recognized that while the exemplary embodiments are described in terms of one- or two-way transfers of data and/or information, the methods and apparatus of the invention may be readily adapted to three-way or other transfers of data, or even sequential transfers between three or more parties (e.g., from one party to an second to a third, and so forth). Further, one of ordinary skill in the art will recognize that alternate methods of verification and authentication providing features and functionality similar to those described herein may be applied to the invention disclosed herein without changing the novel principles taught.

Furthermore, while the exemplary embodiments presented herein are generally described in the context of transfers of data and/or information that are related or even contemporaneous with financial or other such transactions (e.g., the sale of an item or service, a visit to a physician's office, etc.), the invention is no way limited to such related or contemporaneous transactions or transfers. For example, a logically related transfer of information or data is contemplated, such as where the occurrence of an e.g., sales transaction between a first party and second party may instigate or act as a condition precedent to a second logically related transaction between a third and fourth party. Alternatively, a first transaction between the first and second party may act as a predicate for a later separate but related transaction or transfer of data/information between the same parties.

As used herein, the term "Data Transfer Device" (DTD) refers to a portable or semi-portable device incorporating, at a minimum, the ability to store or retain data in an electronic (including magnetic) or optical format. Optionally, the DTD may also incorporate additional capabilities, including but not limited to the ability to transmit, process, encrypt and decrypt data files and/or read biometric authentication information (for example a fingerprint scanner—examples of which include the Trek 2000 International, Ltd., Thumb-Drive™ Touch and the Memory Experts International Clip-Drive™ Bio). Examples in the art of DTDs include but are not limited to: cell phones, radio pagers, devices incorporating Microsoft Corporation's Smart Personal Objects Technology, personal digital assistants ("PDAs"), floppy disks, USB flash memory keys and other erasable programmable memory ("EPROM") based data storage devices; optical or holographic storage devices, data storage devices employing ferroelectric memory or magnetic random-access memory ("MRAM") based chips; IBM Micro Drives, integrated circuit "smart cards", magnetic strip based payment cards, both passive and active radio frequency identification technology ("RFID") based devices, devices designed to communicate using the Infrared Data Association's ("IrDA") infrared based wireless transmission standard, devices communicating via wireless radio frequency ("RF") based local area network ("LAN") connections based on the IEEE 802.11 or 802.15 access standards and related variations (including both frequency hopping and direct sequence spread spectrum variants), devices designed to exchange data via the "Bluetooth" 2.45 GHz frequency band based wireless communication specification, devices designed to exchange data via the Wireless USB standard and devices designed to exchange data via Panasonic "Smart SD" (Secure Digital) cards.

As used herein, the term "Vendor" refers generally to any source or prospective source of goods, services, data or information of interest, while the term "Purchaser" refers generally to any one or more users or prospective users of goods, services, data or information. For example, in the context previously described herein, a Vendor may comprise a seller or provider of goods or services, while a Purchaser may comprise a buyer of such goods or services. Alternatively, a Vendor may comprise for example a patient (or group of patients) associated with a physician, who acts as a source of medical or personal data, while the Purchaser may comprise the physician or his parent health care organization or hospital. As another example, a Purchaser or Vendor may comprise a vehicle owner, and the Vendor or Purchaser a mechanic or repair facility that receives or captures data relating to the vehicle.

Furthermore, the terms "Purchaser" and "Vendor" are used in the broad sense and the use of such terms is not intended to imply that the applicability of the instant invention is limited to the period immediately before, during or after a transaction. For example, a "Purchaser" could also mean an entity only considering a purchase and a "Vendor" could also mean an entity only proposing a sale to the Purchaser.

Distributed databases and related methods of synchronizing multiple databases and data files, including but not limited to independent distributed database systems of the type taught in U.S. Pat. No. 6,446,092 B1 to Sutter, are well known in the art and coordinate distribution and synchronization of data across multiple discrete databases in order to allow a related set of data to be shared among multiple users in situations in which connections between databases are not stable, but rather are transient in nature.

Point of Sale Terminals ("POSTs") are well known in the art and include, e.g., electronic cash registers or personal computers running appropriate software that, at a minimum, enable processing and tracking of data related to transactions between Vendors and Purchasers. Optionally, POSTs may incorporate additional capabilities, including but not limited to, the ability to record and track customer orders; read data from and write data to DTDs, both wirelessly and utilizing wired connections; process credit and debit cards and connect to other systems in a network and manage inventory. Common and more sophisticated examples of POSTs include the Epson IM-800, the IBM SurePOS 700, the Verifone Omni 3700 family and the Hypercom ICE 5700Plus and are described in U.S. Pat. No. 6,533,168 B1 to Ching; U.S. Pat. No. 6,615,194 B1 to Deutsch et al. and U.S. Pat. No. 6,701,192 B1 to Herwig, all of which are incorporated herein by reference in their entirety. It should be appreciated that alternative devices or systems allowing calculation and recording of transaction data in electronic formats may be substituted without affecting the spirit and scope of the instant invention As used herein, the term "hub" refers generally to a device incorporating means to read data from and write data to devices such as DTDs, either wirelessly or alternatively, utilizing wired connections, and to communicate such data to other devices (whether separate or integrated) such as POSTs. Hubs may also contain additional functionality related to receiving and transmitting Specific Transaction Data and Information between peripheral devices and POSTs, such as the ability to read biometric data for purposes of analyzing and utilizing such data and/or transmitting such data to connected devices for analysis and use. Hubs may be stand-alone devices or may exist as a device or devices providing such functionality integrated into POSTs.

As used herein, the terms "software" and "computer program," refer generally (but not exclusively) to describe code or other instructions to a computerized device or devices that perform a sequence or series of steps. Such programs (and their routines/subroutines) may be rendered in any language including, without limitation, C/C++, Fortran, COBOL, PASCAL, assembly language, markup languages (e.g., HTML, SGML, XML, VOXML), and the like, as well as object-oriented environments such as the Common Object Request Broker Architecture (CORBA), Java™ (including J2ME, Java Beans, etc.) and the like. The term is also meant to encompass distributed software/applications, wherein a portion of an application or software process (or collection of applications/process) are in logical or data communication with other related applications/processes. In general, however, all of the aforementioned terms as used herein are meant to encompass any series of logical steps performed in a sequence to accomplish a given purpose.

As used herein, the term "healthcare entity" refers generally to any entity, group or individual that directly or indirectly provides, arranges, and/or makes payment and/or billing transactions relating to, one or more healthcare services. Examples of such healthcare entities include, without limitation, HMOs, PPOs, hospitals, clinics, physicians, holistic or homeopathic practitioners, chiropractors, laboratories, acupuncturists, university clinics and research programs, and insurers.

Overview

The subject invention relates generally to apparatus and methods adapted to facilitate the transfer of data and information (including Specific Transaction Data and Information) in electronic formats between various entities such as Vendors, Purchasers and other authorized parties. It should be noted that in one salient aspect, the instant invention is intended to provide users with a standardized method with which to transfer a wide variety of data and information types. For example, in the context of control and/or monitoring of equipment (such as an automobile), the invention disclosed herein provides a means whereby the Data Transfer Device may be employed to transfer data and information from said equipment to authorized users of the data and information (for example, in the case of an automobile, the owner of the automobile might download diagnostic and performance data from the automobile onto the Data Transfer Device by means of a Hub integrated with the automobile's systems. In such case, the owner might then provide said diagnostic and performance data to a Vendor providing automotive repair services to said owner in an electronic format as a further download from the DTD to the Vendor's computer for subsequently analysis).

This transfer of data or information can serve multiple purposes, including, but limited to, support of transactions (for example transfers of Specific Transaction Data to or from Payment Card issuers or banks) or making Specific Transaction Data or Information available to parties that have an authorized use for the Specific Transaction Data or Information (for example in the context of expense reimbursements, to companies providing services to Purchasers and employers of the Purchasers related to processing the data for expense reimbursement purposes or in the case of healthcare providers, transfers of healthcare information about a patient from a treating physician to a new physician who will begin providing care to the patient).

One exemplary embodiment set forth herein relates to a data exchange apparatus and method for: (1) integrating electronic transmissions of billing data from Purchasers to Vendors with electronic transmissions of Specific Transaction Data and Information from Vendors to Purchasers; (2) securing Specific Transaction Data and Information from unauthorized disclosure or use (i.e., providing data/information confidentiality); (3) facilitating exchanges of Specific Transaction Data and Information between Purchasers, Vendors and related authorized parties; (4) providing a means for verifying the originator/source (authentication) and/or accuracy (verification or validation) of Specific Transaction Data and Information, and (5) facilitating electronic exchanges of Specific Transaction Data and Information between Vendors, Purchasers and other parties playing a role in the transaction or having an authorized use for the Specific Transaction Data and Information.

Benefits obtained from utilization of the apparatus and methods disclosed herein include (i) reduction of errors caused by manually (or even electronically) entering and reentering data or information; (ii) reduction of the number of times that data or information must be entered (thereby improving efficiency); (iii) provision of some level of assurance to the users of the transferred data/information regarding the source and nature of the data; (iv) authentication regarding the source of the transacted data or information; (v) validation that the transferred data/information is in the same form and comprises the same content it was in at the time it was generated or sent.

Vendor Side Exemplary System Layout

In FIG. 2, the diagram illustrates the basic components of the Vendor side of an exemplary system conforming to the principles taught in the instant invention. The Vendor's POST 201 is in data communication via wired or wireless means to a Hub 202. The Hub 202 incorporates, at a minimum, wired or wireless means for communicating with DTDs of various types (collectively represented by 203) and may or may not be connected to an independent power source (not shown).

Purchaser Side Exemplary System Layout

Figure 3:
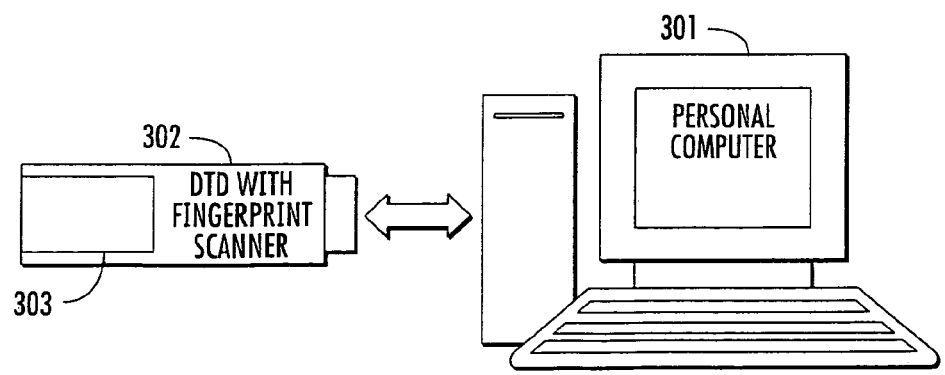
FIG. 3 is a diagram illustrating the basic components of an exemplary Purchaser side configuration of a system conforming to the principles taught in the instant invention.

In FIG. 3, the diagram illustrates the basic components of the Purchaser side of an exemplary system conforming to the principles taught in the instant invention. DTDs of various types (collectively represented by 302) connect to a Purchaser's personal computer 301 by wired or wireless means as dictated by the requirements of the specific DTD used. The DTD 302, as depicted, incorporates a fingerprint scanner 303 (although this is not a mandatory aspect of the DTD 302 configuration).

Vendor Side Data Transfer

Figure 4:
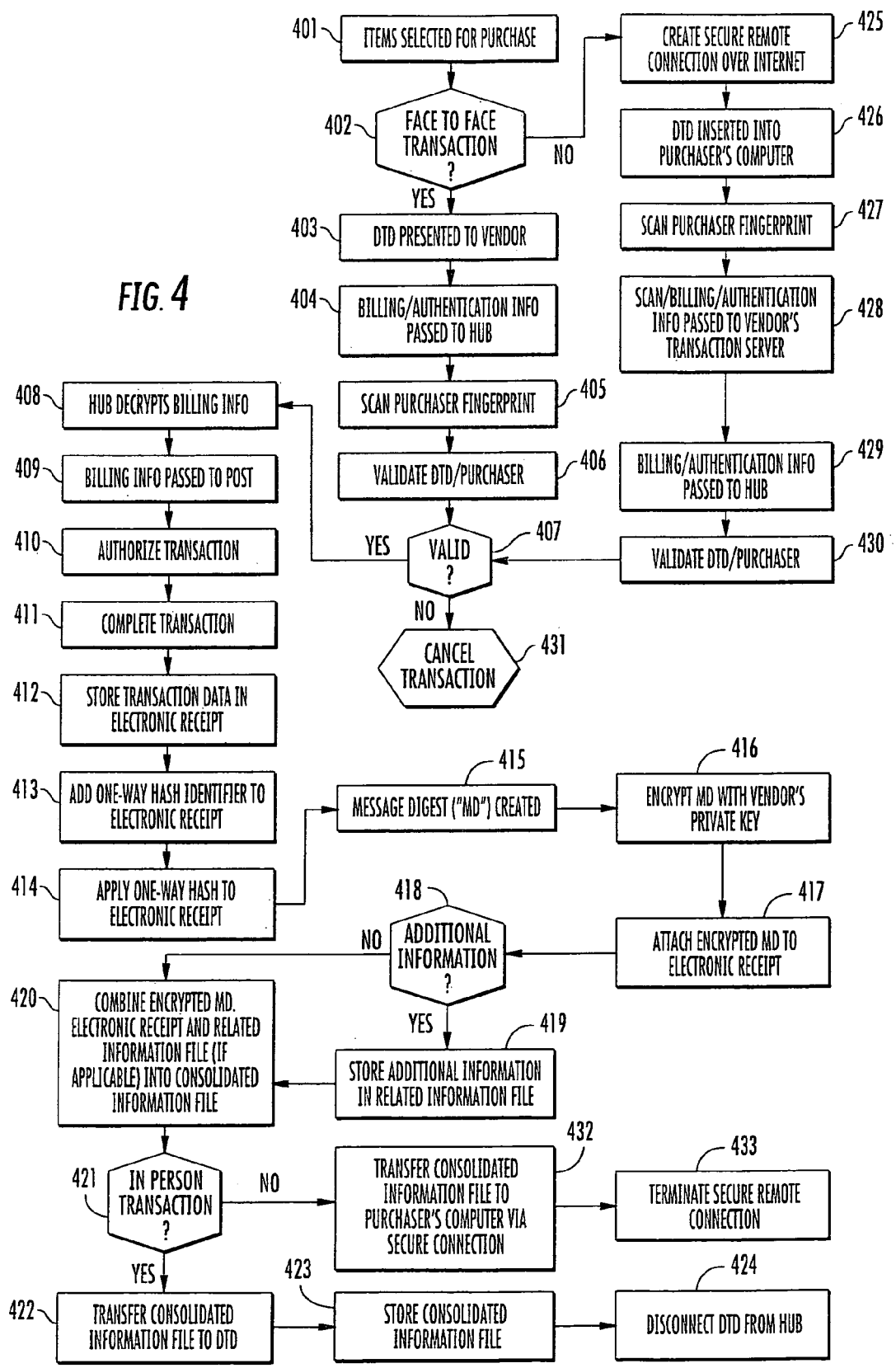
FIG. 4 is a flowchart of an exemplary method of providing billing information, creating a Consolidated Information File (as such term is defined herein) and providing the Information File to a Purchaser according to the invention.

FIG. 4, is a logical flowchart showing one embodiment of a method of enabling a Purchaser to provide a Vendor with billing information in an electronic format and enabling a Vendor to provide a Purchaser with transaction specific Information and other related Information in an electronic format that can be transferred by a Purchaser into his or her computer without manually reentering the information, and yet may be authenticated as to source and integrity.

In accordance with an aspect of the present invention, in a transaction between a Vendor and a Purchaser, the subject of the purchase (whether a tangible or non-tangible item) is identified (step 401). If the transaction is in-person, the DTD 203 is presented to the Vendor (step 403). The Vendor connects the DTD 203 to a Hub 202 either built in to the Vendor's POST (not shown) or attached to the Vendor's POST 201. In one embodiment of the present invention, the POST 201 is a self-service kiosk allowing Purchasers to purchase goods or services, or conduct airline check-in or hotel check-in/check-out activities with minimal or no additional assistance from Vendor representatives.

It will be appreciated by one skilled in the art that the DTD 203 may be capable of employing one or more of a multiplicity of wired and wireless connection methods and protocols to communicate data to and from the Hub 202. Physical connections and proximity between the Hub 202 and the DTD 203 are optional and dependent on the operational requirements of the specific application of the principals taught herein. All such methods are within the scope of the instant invention.

The Hub 202 reads the encrypted billing information (which may include Purchaser authentication data identifying the thumbprint(s) of the party(ies) authorized to use the DTD 203) stored on the DTD 203 (step 404) and decrypts the Purchaser authentication data stored in the encrypted billing information. Optionally, additional Information may also be stored on the DTD 203 and read by the Hub 202. The Hub 202 then authenticates the identity of the Purchaser by reading the thumbprint of the Purchaser presenting the DTD 203 (step 405) by means of a thumbprint scanner present on either the Hub 202 or the DTD 203 and then comparing that data against the decrypted Purchaser authentication data (step 406). If the thumbprint scan information matches the decrypted Purchaser authentication information, the Purchaser is authenticated. If the thumbprint scan information does not match the decrypted Purchaser authentication information, the Purchaser is not authenticated.

If the Purchaser is authenticated as valid, the Hub 202 decrypts the billing information (step 408), indicates to the POST 201 that the transaction may proceed and passes the decrypted billing information to the POST 201 (step 409). The POST 201 then uses existing credit card transaction approval methods to confirm that the billing account is valid for use (step 410). If the Purchaser is not authenticated or the transaction is rejected, the Hub 202 alerts the POST 201 which then cancels the transaction (step 431) or alternatively, requests an alternate method of payment. If the Purchaser is authenticated and the transaction is approved, the POST 201 then completes the transaction (step 411). In an alternate implementation, a personal identification number can be used instead of the thumbprint information to authenticate the purchaser or can be used in addition to the thumbprint information to provide additional assurances that the Purchaser is authorized to transact purchases using the billing information on the DTD 203. In a further alternate implementation, the transaction may be completed using billing information not stored on the DTD 203 (for example a purchase based on a payment of cash).

After the transaction is completed, Specific Transaction Data, including, optimally, the name of the vendor, the date of the transaction, the list of the items transacted (with individual prices), the subtotal of the transaction, the tax (if applicable), the total of the transaction purchase price, the Vendor's transaction identifier number (if applicable) and a Payment Card transaction reference number (if applicable) is electronically stored in a binary file (the "Electronic Receipt") (step 412). Information identifying the One-Way Hash Algorithm that will be applied to the Electronic Receipt is also stored in the Electronic Receipt (step 413). A One-Way Hash algorithm is then applied to the Electronic Receipt (step 414) yielding a Message Digest that is unique to the Electronic Receipt (step 415). The Message Digest is then encrypted using a Private Key belonging to the Vendor (step 416) yielding an Encrypted Message Digest that is unique to the specific transaction and Vendor. The Encrypted Message Digest is then attached to the Electronic Receipt (step 417). If desired, additional Information indirectly related to the transaction at hand (for example Vendor or Purchaser provided comments, data relating to the Purchaser's participation in the Vendor's loyalty program or in the case of a medical Vendor, updates to the Purchaser's medical record or other relevant data), may also be either included in the Electronic Receipt or stored in a separate, preferably encrypted electronic file (a "Related Information File") or both (step 419). Optionally, a One-Way Hash Algorithm can be applied to the Related Information File in the same manner as described above with respect to the Electronic Receipt to create an Encrypted Message Digest corresponding to the Related Information File.

The Encrypted Message Digest, the Electronic Receipt and the Related Information File (if applicable) are then combined into a binary file or file set (hereinafter be referred to as an "Consolidated Information File") (step 420). If the transaction is being conducted in person, the Consolidated Information File will be transferred from the Hub 201 to the DTD 203 (step 422) where it will be stored as an individual file or checked into a software application along with other Consolidated Information Files for secure (encrypted) or non-secure storage (step 423). The DTD 203 can then be disconnected (whether physically or wirelessly connected) from the Hub 202 (step 424).

If the transaction is not being conducted in person (for example a transaction conducted over the Internet), the process will be largely the same as described above except: following step 402, the Purchaser establishes a secure connection between their web browser software and the Vendor's transaction server using one of several secure communication standards (such as Secure Socket Layer) that are well known in the art (step 425). The Purchaser is then prompted to connect the DTD 302 (whether via wireless or wired connection) to a hardware connection on their computer 301 (step 426). Depending on the specific configuration of the DTD 302, various wired and/or wireless connection standards may be used either singly or in conjunction with additional hardware attached to the Purchaser's computer 301. A thumbprint scanner 303 present on the DTD 302 reads the thumbprint of the Purchaser (step 427). The thumbprint scan information and the encrypted billing information (which includes encrypted authentication information including data identifying the characteristics of the authorized billing party's thumbprint) on the DTD 302 are then transferred to the transaction server via the secured connection (step 428). Software on the transaction server then transfers the thumbprint scan information and the billing information to the Hub 202 (step 429). The Hub 202 decrypts the Purchaser authentication data stored in the encrypted billing information and then uses the thumbprint scan information to authenticate the identity of the Purchaser by comparing the thumbprint scan information to the decrypted Purchaser authentication information (step 430). If the thumbprint scan information matches the decrypted Purchaser authentication information, the Purchaser is authenticated. If the thumbprint scan information does not match the decrypted Purchaser authentication information, the Purchaser is not authenticated.

If the Purchaser is authenticated as valid, the transaction is completed as per the method for in-person transactions (beginning at step 408) with the difference that, after step 416, rather than transferring the Consolidated Information File to the DTD 203, the Hub 202 transfers the Consolidated Information File to the transaction server which in turn transfers the Consolidated Information File back to the Purchaser's computer 301 via the secured connection (step 432). The secure connection is then terminated (step 433).

It will be appreciated by one of ordinary skill in the art that the exemplary transaction described above incorporates certain elements that are optional and that can be changed or omitted without materially changing the scope or nature of the instant invention. For example, in the event that a Vendor wishes to transfer Specific Transaction Data or Information to a Purchaser without first completing a transaction (such as in a case where the data pertains to a previously completed transaction, or where a healthcare provider wishes to provide Information comprising healthcare treatment or pharmaceutical prescription records to a patient), the required data would simply be selected and then stored pursuant to the process disclosed above beginning with storage of said data in an electronic file (step 412). From that step forward, the process would proceed as previously disclosed.

Purchaser Side Data Transfer

Figure 5:
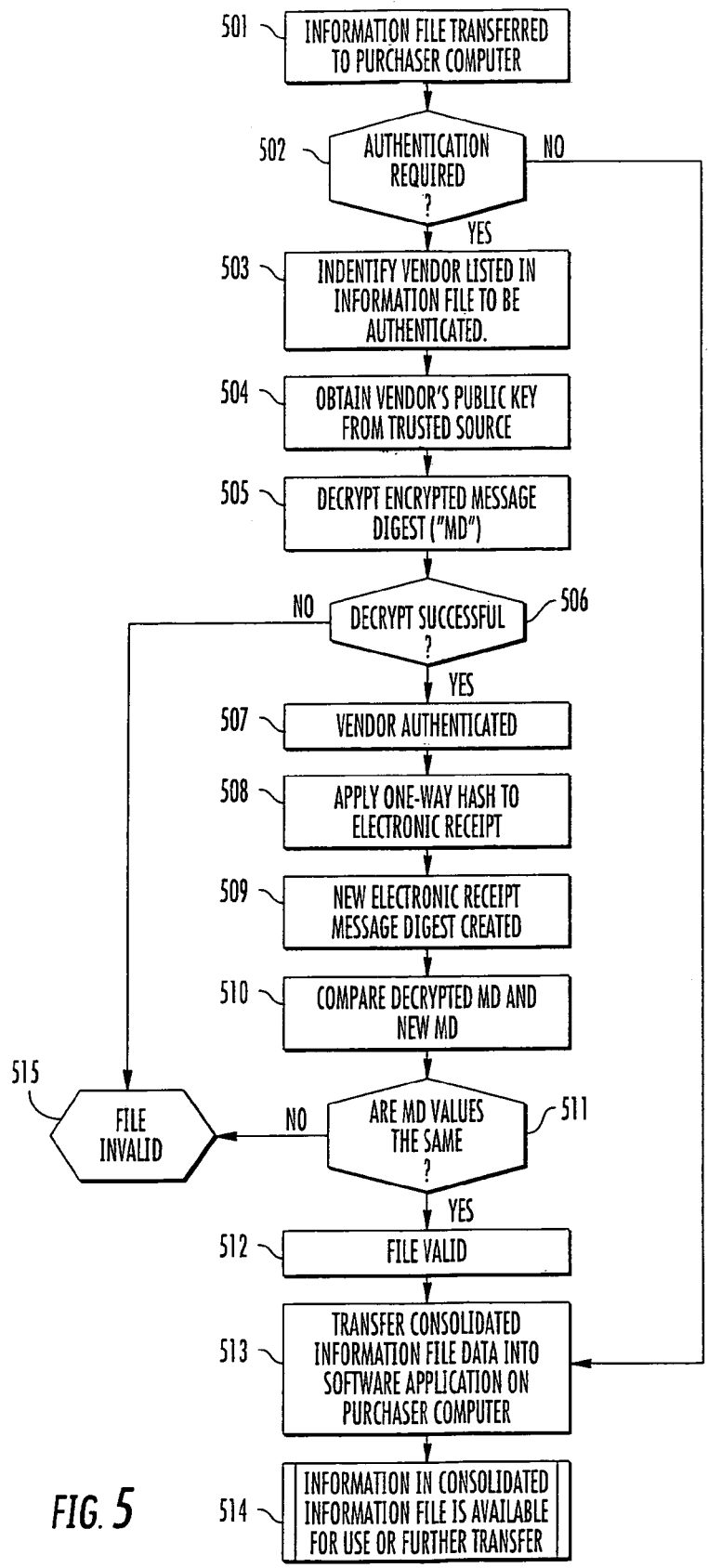
FIG. 5 is a flowchart of an exemplary method of verifying the authenticity and integrity of elements within a Consolidated Information File and making the Consolidated Information File available for use by a Purchaser or another party authorized to access the Consolidated Information File according to the invention.

FIG. 5 is a logical flowchart showing one embodiment of a method of enabling a Purchaser to use data in a Consolidated Information File, authenticate an Electronic Receipt as to source, determine whether an Electronic Receipt has been modified since its creation and to make the data available for further use. A Consolidated Information File containing Specific Transaction Data and/or Information is transferred to a Purchaser designated computer (step 501). If authentication of the Electronic Receipt within the Consolidated Information File is not required, a synchronization application on the computer transfers the Specific Transaction Data and/or Information in the Consolidated Information File to a Purchaser designated software application or applications enabling storage, analysis, use and transfers of said Specific Transaction Data and/or Information (step 512). If authentication of Electronic Receipt within the Consolidated Information File is required, the Purchaser or another party authorized by the Purchaser to authenticate Electronic Receipt (collectively referred to herein as a "Verifying Party"), so indicates in a software application executing on the Purchaser's computer 301 and designed, at least in part, to work in conjunction with the Consolidated Information Files (step 502). The software application reads the Vendor Information from the Electronic Receipt to identify the Vendor corresponding to the Electronic Receipt to be authenticated (step 503). The software application then refers to a trusted internal or external database or on-line service (a "Trusted Source") to obtain the Public Key that corresponds to the Vendor identified in the Electronic Receipt (step 504). The software then uses the Vendor's Public Key to decrypt the Encrypted Receipt Message Digest component of the Consolidated Information File (step 505). If the Public Key provided by the Trusted Source does not decrypt the Encrypted Receipt Message Digest successfully, the software indicates to the Verifying Party that the Electronic Receipt is not authenticated as having been created by the Vendor identified in the Consolidated Information File (step 514) and the process stops. If the Public Key provided by the Trusted Source successfully decrypts the Encrypted Receipt Message Digest, a decrypted Message Digest derived from the Encrypted Receipt Message Digest is created and the software indicates to the Verifying Party that the Electronic Receipt is authenticated as having been created by the Vendor identified in the Electronic Receipt (step 507). The software then applies the One-Way Hash Algorithm identified in the Electronic Receipt to the Electronic Receipt (step 508). A "new" Electronic Receipt Message Digest results (step 509). The software then compares the "new" Message Digest to the Message Digest derived from the decryption of the Encrypted Receipt Message Digest (step 510). If the newly created Message Digest is not identical to the Message Digest derived by decrypting the Encrypted Receipt Message Digest contained in the Consolidated Information File, the software indicates to the Verifying Party that the Electronic Receipt is not validated and has been modified since the time of its creation and the process stops (step 515). If the newly created Message Digest is identical to the decrypted Message Digest derived from the decryption of the Encrypted Receipt Message Digest, the software indicates to the Verifying Party that the Electronic Receipt is validated as not having been modified from the time of its creation (step 512).

Optionally, if at the time of the original transaction, a One-Way Hash Algorithm was applied to the Related Information File in the same manner as described above with respect to the Electronic Receipt, then a process similar to that applied to the Electronic Receipt is applied to the Encrypted Message Digest corresponding to the Related Information File to verify and authenticate the Related Information File.

If the Electronic Receipt and/or Related Information File has(have) been validated and authenticated, a synchronization application on the computer then transfers the Specific Transaction Data and/or the Information in the Information File (or optionally the Electronic Receipt or the Information File in its entirety) to a Purchaser designated software application or location enabling storage, analysis, use and transfers of said Specific Transaction Data and Information (step 513). The Specific Transaction Data and Information are then available for use (for example in Intuit's Quicken or Microsoft's Money personal finance management software packages) or for further transfer (for example, in the context of completion of corporate expense reimbursement request forms, for importation into and submission with a Purchaser expense reimbursement request form).

In one alternative implementation, Purchasers may add electronic annotations directly to the Electronic Receipt or Related Information File in partitioned portions of said files using a means either built in to the Hub 202 or the DTD 203. In the case of a means built into the DTD 203 said means would allow Purchasers to add electronic annotations to Electronic Receipts or Related Information Files using a keyboard such as the one incorporated into Research in Motion's BlackBerry™ Wireless Handheld device (and further described in U.S. Pat. No. 6,611,255 B2 to Griffin et al., incorporated herein by reference in its entirety); a handwriting recognition based capability such as that incorporated into Microsoft's Transcriber 1.5 software or a character set and handwriting recognition system such as the ones described in U.S. Pat. No. 6,493,464 to Hawkins et al. and U.S. Pat. No. 5,889,888 to Marianetti, II, et al., both incorporated herein by reference in their entirety. As yet another alternative, a speech recognition (or speech-to-text) system may be employed, such as for example the IBM ViaVoice family of speech recognition software, which allows voice-controlled navigation through various fields within a data file, as well as entry of text or other types of annotations. It will be obvious to one skilled in the art that other methods of digital or analog data entry may be substituted for the methods described above with similar effect and that such other methods are within the scope and spirit of the invention disclosed herein.

Using these or similar methods, Purchasers could add additional Information about the transaction (for example, in the case of a business dinner which will be subsequently submitted as a business expense reimbursement request, the name of the people present at the meal and the business related matters discussed at the meal) to a dedicated data field or fields ("Comment Fields") within the Electronic Receipt, the Related Information File or the Consolidated Information File or all three. The Comment Fields would allow annotation of the Information File without interfering with the verification and authentication features incorporated into the Information File.

Figure 6:
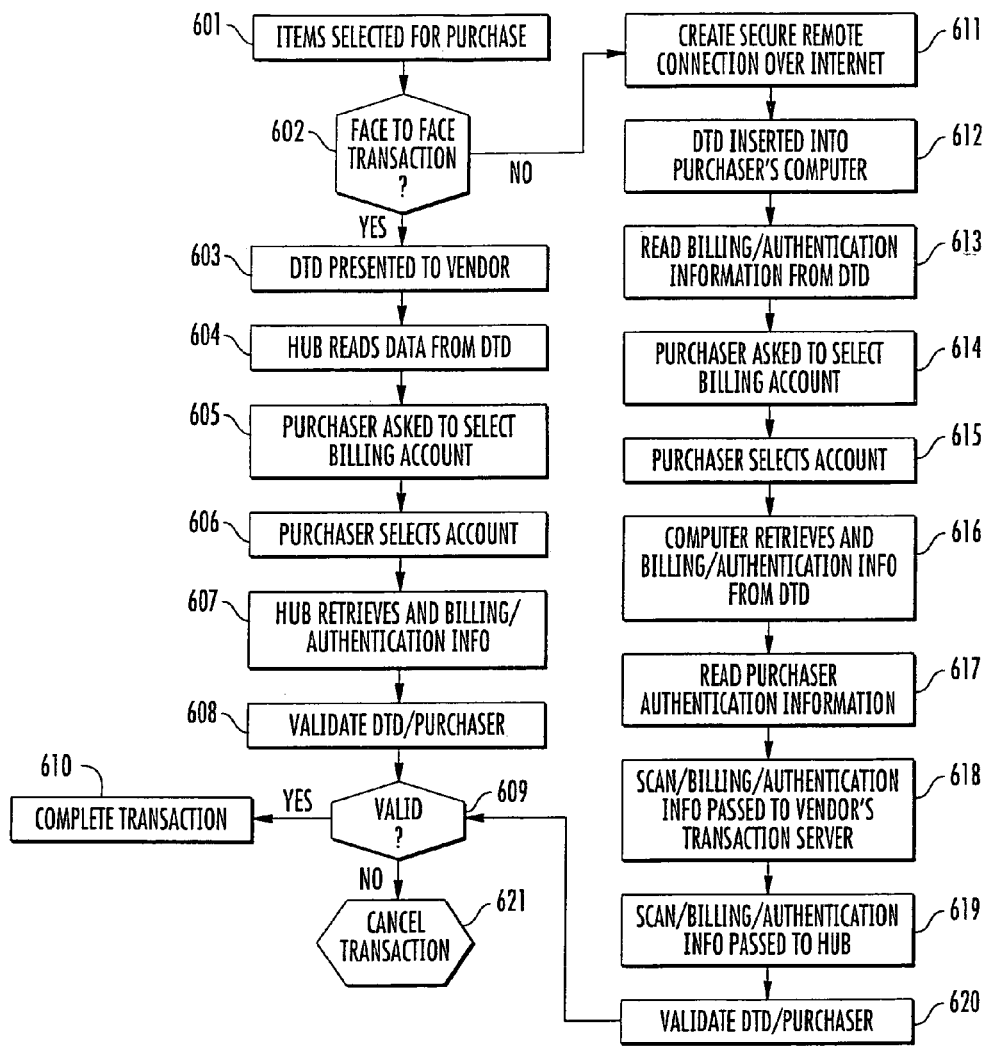
FIG. 6 is a flowchart of an alternate embodiment of the method of providing billing information where the DTD contains billing and Purchaser authentication information corresponding to multiple billing accounts.

FIG. 6 is a logical flowchart showing an alternative embodiment of the invention incorporating the capability to manage information about multiple billing accounts and their corresponding authentication information. In the alternative embodiment, billing information relating to multiple Purchaser billing accounts is stored in encrypted form on the DTD 203 along with corresponding authentication information (such as a user personal identification number or numbers or information allowing the system to authenticate the Purchaser's thumbprint) also stored in an encrypted format. Each billing account is identified by a user selectable name that does not include the actual billing account number (for security purposes).

If the transaction is in-person, the DTD 203 is presented to the Vendor (step 603). The Vendor connects the DTD 203 to a Hub 202 either attached to the Vendor's POST 201 or built in to the Vendor's POST (not shown). The Hub 202 reads Purchaser authentication and encrypted billing information (which includes data identifying the thumbprint(s) of the party(ies) authorized to use the DTD 203) stored on the DTD 203 (step 604). A display either built in to the Hub 202 or connected to the Hub 202 (not shown) displays the user selected names for each of the billing account numbers stored on the DTD 203 and asks the Purchaser to select an account for use in the transaction (step 605). After the Purchaser selects a billing account (step 606), the Hub 202 retrieves the billing information corresponding to the selected billing account from the DTD 203 (which includes Purchaser authentication data identifying the thumbprint(s) of the party (ies) authorized to use that billing account) (step 607) and decrypts the Purchaser authentication data stored in the encrypted billing information. The Hub 202 then authenticates the identity of the Purchaser by reading the thumbprint of the Purchaser presenting the DTD 203 by means of a thumbprint scanner present on either the Hub 202 or the DTD 203 and then comparing that data against the decrypted Purchaser authentication data (step 608). If the thumbprint scan information matches the decrypted Purchaser authentication information, the Purchaser is authenticated. If the thumbprint scan information does not match the decrypted Purchaser authentication information, the Purchaser is not authenticated.

If the Purchaser is authenticated as valid, the Hub 202 indicates to the POST 201 that the transaction may proceed, decrypts the billing information and passes the billing information to the POST. The POST then completes the transaction as described in the manner previously described in FIG. 4 beginning with step 409 (step 610). If the Purchaser is not authenticated, the Hub 202 alerts the POST 201 which then cancels the transaction (step 621) or alternatively, asks for an alternate method of payment.

If the transaction is not being conducted in person (for example a transaction conducted over the Internet), the process will be largely the same as described above except: following step 602, the Purchaser establishes a secure connection between their web browser software and the Vendor's transaction server using one of several secure communication standards (such as Secure Socket Layer) that are will known in the art (step 611). The Purchaser is then prompted to connect the DTD 302 (whether via wireless or wired connection) to a hardware connection on their computer 301 (step 612). Depending on the specific configuration of the DTD 302, various wired and/or wireless connection standards may be used either singly or in conjunction with additional hardware attached to the Purchaser's computer 301. Software (not shown) on the Purchaser's computer 301 reads encrypted Purchaser authentication and billing information (which includes data identifying the thumbprint(s) of the party(ies) authorized to use the DTD 203) stored on the DTD 302 (step 613). The Purchaser's pre-selected names for each of the billing account numbers stored on the DTD 302 are displayed for the Purchaser and the Purchaser is asked to select an account for use in the transaction (step 614). After the Purchaser selects a billing account (step 615), the Purchaser's computer 301 retrieves the billing information corresponding to the selected billing account from the DTD 302 (which includes Purchaser authentication data identifying the thumbprint(s) of the party(ies) authorized to use that billing account) (step 616) and decrypts the Purchaser authentication data stored in the encrypted billing information. A thumbprint scanner 303 present on the DTD 302 reads the thumbprint of the Purchaser (step 617). The thumbprint scan information and the encrypted billing information (which includes encrypted authentication information including data identifying the characteristics of the authorized billing party's thumbprint) on the DTD 302 are then transferred to the transaction server via the secured connection (step 618). The transaction server then transfers the thumbprint scan information and the billing information to the Hub 202 (step 619). The Hub 202 decrypts the Purchaser authentication data stored in the encrypted billing information and then uses the thumbprint scan information to authenticate the identity of the Purchaser by comparing the thumbprint scan information to the decrypted Purchaser authentication information (step 620). If the thumbprint scan information matches the decrypted Purchaser authentication information, the Purchaser is authenticated. If the thumbprint scan information does not match the decrypted Purchaser authentication information, the Purchaser is not authenticated.

If the Purchaser is authenticated as valid, the Hub 202 indicates to the POST 201 that the transaction may proceed, decrypts the billing information and passes the billing information to the POST. The POST then completes the transaction as described in the manner previously described in FIG. 4 beginning with step 409 (step 610). If the Purchaser is not authenticated, the Hub 202 alerts the POST 201 which then cancels the transaction (step 621) or alternatively, asks for an alternate method of payment.

Figure 7:
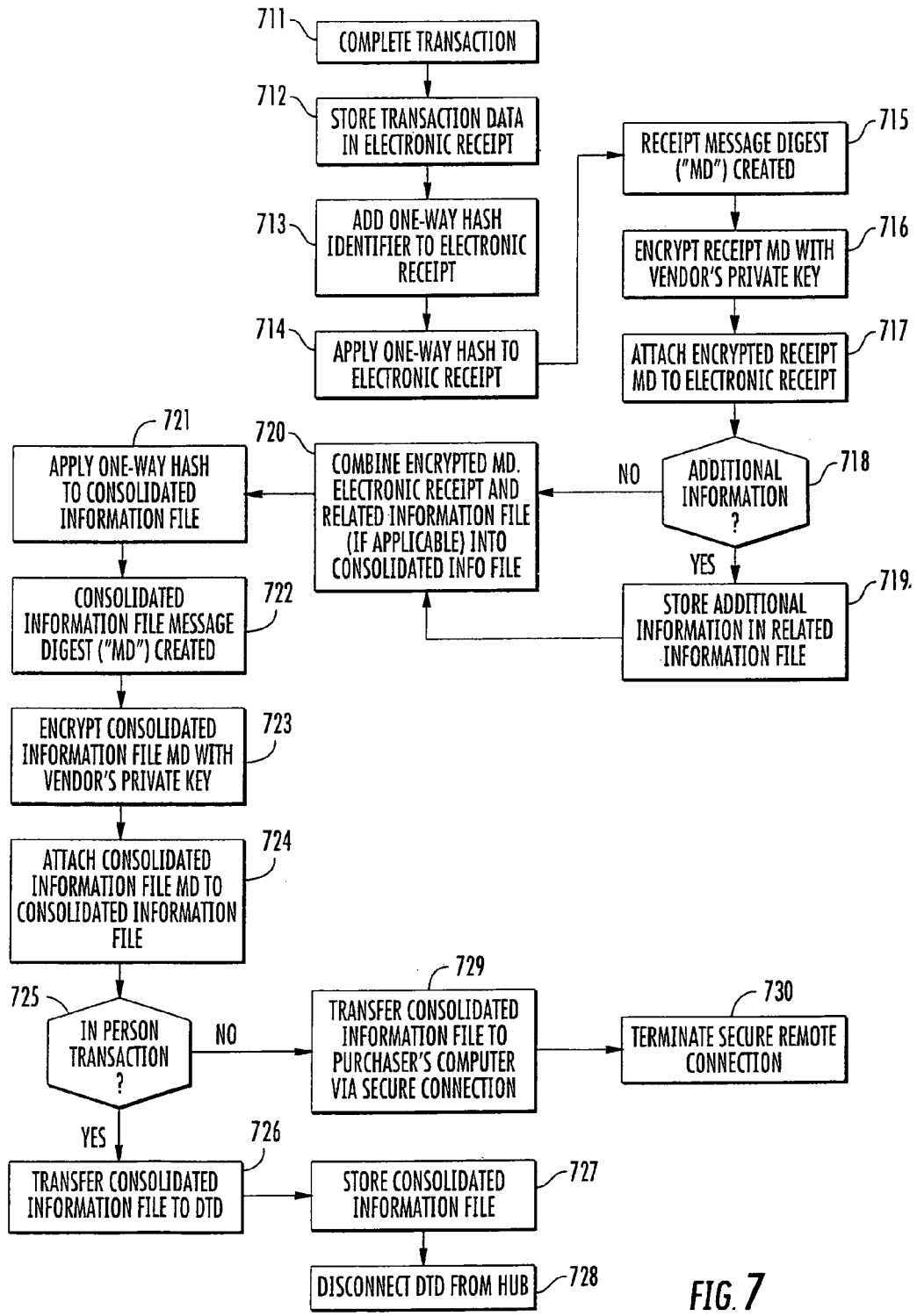
FIG. 7 is a flowchart of an alternate embodiment of the method of verifying the authenticity and integrity of elements within a Consolidated Information File.

FIG. 7 is a flowchart of an alternate method of verifying the authenticity and integrity of elements within a Consolidated Information File. After the steps prior to step 410 on FIG. 4 are completed, the Specific Transaction Data about the transaction, including, optimally, the name of the vendor, the date of the transaction, the list of the items transacted (with individual prices), the subtotal of the transaction, the tax (if applicable), the total of the transaction purchase price, the Vendor's transaction identifier number (if applicable) and a Payment Card transaction reference number (if applicable) is electronically stored in a binary file (the "Electronic Receipt") (step 712). Information identifying the One-Way Hash Algorithm that will be applied to the Electronic Receipt is also stored in the Electronic Receipt (step 713). A One-Way Hash algorithm is then applied to the Electronic Receipt (step 714) yielding a Message Digest that is unique to the Electronic Receipt (step 715). The Electronic Receipt Message Digest is then encrypted using a Private Key belonging to the Vendor (step 716) yielding an Encrypted Electronic Receipt Message Digest that is unique to the specific transaction and Vendor. The Encrypted Electronic Receipt Message Digest is then attached to the Electronic Receipt (step 717). If desired, additional Information indirectly related to the transaction at hand (for example data relating to the Purchaser's participation in the Vendor's loyalty program or in the case of a medical Vendor, updates to the Purchaser's medical record), may also be either included in the Electronic Receipt or stored in a separate, preferably encrypted electronic file (a "Related Information File") or both (step 719). The Encrypted Electronic Receipt Message Digest, the Electronic Receipt and the Related Information File (if applicable) are then combined into a binary file or file set (hereinafter be referred to as an "Consolidated Information File") (step 720). A One-Way Hash algorithm is then applied to the Consolidated Information File (step 721) yielding a Message Digest that is unique to the Consolidated Information File (step 722). The Consolidated Information File Message Digest is then encrypted using the same Vendor Private Key that was used to encrypt the Electronic Receipt Message Digest (step 723) yielding an Encrypted Consolidated Information File Message Digest that is unique to the specific transaction and Vendor. The Encrypted Consolidated Information File Message Digest is then attached to the Consolidated Information File (step 724)

If the transaction is being conducted in person, the Consolidated Information File will be transferred from the Hub 201 to the DTD 203 (step 726) where it will be stored as an individual file or checked into a software application or a consolidated data file (for example as a series of entries in a relational database table or tables that are part of an independent distributed database) along with other Consolidated Information Files for secure (encrypted) or non-secure storage (step 727). The DTD 203 can then be disconnected (whether physically or wirelessly connected) from the Hub 202 (step 728).

If the transaction is not being conducted in person, rather than transferring the Consolidated Information File to the DTD 203, the Hub 202 transfers the Consolidated Information File to the transaction server which in turn transfers the Consolidated Information File back to the Purchaser's computer 301 via the secured connection (step 729). The secure connection is then terminated (step 730).

Alternatively, if encryption is not required or desired, after the Specific Transaction Data is stored in the Electronic Receipt (step 712) the Electronic Receipt may be combined with Information (if desired) into a Consolidated Information File (step 720) (omitting steps 713 through 717). In such case, the Consolidated Information File will not contain an Encrypted Electronic Receipt Message Digest. The Consolidated Information File will not be encrypted, but rather will then be transferred from the Hub 201 to the DTD 203 (in the case of an in-person transaction) (step 726) (omitting steps 721 through 724) or to the transaction server for transmission to the Purchaser's computer 301 (in the case of a not in-person transaction) (step 729) (omitting steps 721 through 724).

Figure 8:
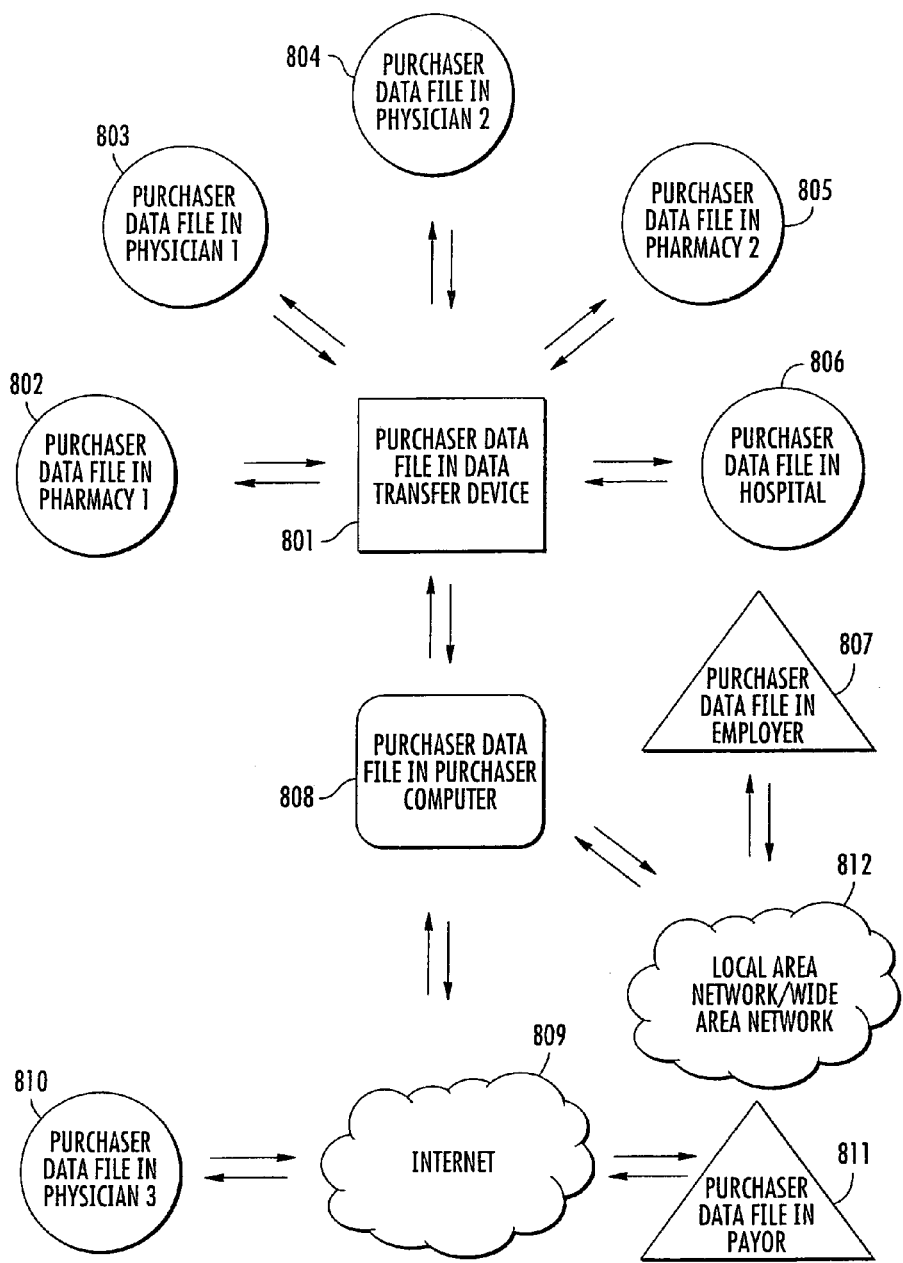
FIG. 8 is a graphical illustration of one embodiment of a method of transferring healthcare data and healthcare related data employing the principles of the present invention.

FIG. 8 is a diagram of an exemplary embodiment of the method of transferring healthcare data and healthcare related data employing the principles taught in the instant invention. Specific Transaction Data and Information is exchanged between a Purchaser and its various healthcare Vendors as well as other authorized users of the data (in this example, the Purchaser's employer and the healthcare insurance company paying the Vendors for the healthcare services). At such times as the Purchaser may choose, the Purchaser's distributed database Data File on a Data Transfer Device (801) can be synchronized with Purchaser's distributed database Data File hosted by Purchaser's Pharmacy #1 (802), Purchaser's distributed database Data File hosted by Purchaser's Physician #1 (803), Purchaser's distributed database Data File hosted by Purchaser's Physician #2 (804), Purchaser's distributed database Data File hosted by Purchaser's Pharmacy #2, and/or Purchaser's distributed database Data File hosted by Purchaser's Hospital (806). In each case, synchronization of the distributed database Data File on the Data Transfer Device (801) and the distributed database Data File that is hosted by the Vendor in question is initiated by connecting the Purchaser's Data Transfer Device (not shown) via wired or wireless means to either a computer hosting the Vendor's version of Purchaser's Data File or a Hub (not shown) connected to a computer hosting the Vendor's version of Purchaser's Data File (not shown).

After the Data Transfer Device is connected to either the Vendor's computer or the Hub, software resident on either the Data Transfer Device, the Vendor's computer or the Hub manages synchronization of the Data File on the Data Transfer Device (801) with the Data File on the applicable Vendor's computer. The Data Transfer Device is then disconnected from the Vendor's computer or the Hub.

At a later time, the Data Transfer Device is connected to the Purchaser's computer (not shown). At that time, software resident on either the Data Transfer Device or the Purchaser's computer manages synchronization of the Data File on the Data Transfer Device (801) with the Data file on the Purchaser's computer (808). The Purchaser's Data File can also be synchronized via a Local Area Network or Wide Area Network connection (812) to a remote computer on which a distributed database Data File is being hosted (807).

Alternatively, synchronization files can be created from a Vendor's distributed database and emailed to a Purchaser (or alternatively from a Purchaser's distributed database and emailed to a Vendor) in order to allow the Purchaser to use software resident on their computer to synchronize their Data File with the Vendor's emailed synchronization file. As required, the Data File on the Data Transfer Device (801) or the synchronization files created from distributed database Data Files can be processed using the methods taught herein to provide users with the ability to authenticate and verify the information in said File or files.

It will be recognized that while certain aspects of the invention are described in terms of a specific design examples, these descriptions are only illustrative of the broader methods of the invention, and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of processing transaction-related data, comprising:
   generating an electronic file comprising transaction-related data;
   processing said file to create a first indicator of at least the content of said file at a first time;
   encrypting said first indicator to produce at least one encrypted indicator;
   combining said encrypted indicator and said file to form a data structure;
   placing a portable radio frequency-identification (RFID) capable data transfer device in wireless data communication with a device on which said data structure is resident, said RFID capable data transfer device being adapted to store transaction specific data in encrypted form;
   authenticating the identity of a user of said portable RFID capable data transfer device; and
   transferring said data structure to said RFID capable data transfer device if said user's identity is authenticated;
   wherein said act of processing is performed substantially by a point-of-sale device, and said portable RFID capable data transfer device is adapted for data communication with said point-of-sale device via at least one of: (i) direct data communication with point-of-sale device, or (ii) a data networking hub.

2. The method of claim 1, wherein said act of authenticating said identity of said user occurs without disclosing any data used in said authentication in human-cognizable form, said authentication requiring said user to physically possess said data transfer device.

3. The method of claim 1, wherein said authentication comprises using at least dual key encryption.

4. The method of claim 1, further comprising validating at least a portion of said transaction-related data using at least a one-way hash algorithm.

5. The method of claim 1, wherein said act of encrypting comprises encrypting said first indicator such that it may only be decrypted with a decryption key designated by an entity performing said act of encrypting.

6. The method of claim 5, further comprising verifying that said contents of said file are in their original form based at least in part on said content.

7. The method of claim 6, further comprising:
   processing said file to identify said encrypted indicator;
   using said designated decryption key to decrypt said identified encrypted indicator in order to obtain said first indicator; and
   using said first indicator to confirm that at least a portion of said transaction-related data is unchanged.

8. The method of claim 1, further comprising performing at least a portion of said acts of generating, processing, encrypting and combining using at least one software application, said at least one software application being adapted to enable a user to at least capture, annotate, and analyze said transaction-related data.

9. Apparatus adapted to process data selected from the group consisting of: (i) transaction-related data, (ii) personal data; (iii) health care data, and (iv) equipment performance or diagnostics data, the apparatus comprising:
   an input apparatus adapted to receive said data from at least one source; and
   a computer apparatus operatively coupled to said input apparatus and adapted to:
      generate at least one electronic file comprising said data;
      process said at least one file to create a first indicator of at least the content of said at least one file at a first time;
      encrypt said first indicator to produce an encrypted indicator;
      combine said encrypted indicator and said at least one electronic file to form a data structure;
      store said data structure; and
      transmit said data structure from said apparatus to a point of sale device disposed at a seller's premises.

10. The apparatus of claim 9, wherein said computer apparatus comprises a digital processor and at least one software application adapted to run thereon, said software application being configured for logical communication with a software process of at least one of (i) said at least one source, and/or (ii) said point of sale device.

11. The apparatus of claim 8, wherein said computer apparatus is configured to support (i) authentication using at least dual key encryption; and (ii) validation of at least a portion of said data using at least a one way hash algorithm, by a recipient of said data structure.

12. The apparatus of claim 9, wherein said computer apparatus is configured to support authentication of said data structure without disclosing said data in a human-cognizable form.

13. The apparatus of claim 9, wherein said computer apparatus is further adapted to periodically synchronize said data structure with a second data structure residing on a remote computer device accessible via a local or wide area connection established between a first device hosting said first data file and said remote computer device.

14. The apparatus of claim 9, wherein said computer apparatus is further adapted to:
   store biometric information relating to a party; and
   allow said party to authenticate his or her right to use said data to complete a transaction without disclosing said data in any human-cognizable form, said authentication being based at least in part on said biometric information.

15. The apparatus of claim 9, wherein said computer apparatus is further adapted to generate at least one additional file comprising second data.

16. The apparatus of claim 15, wherein said second data comprises electronically readable notations to said data in said electronic file, said notations being selected from the group consisting of: (i) instructions relating to decryption of said at least one electronic file; and (ii) information relating to the content of said at least one electronic file.

17. A paper-less method of doing business, comprising:
   generating via a first entity at least one first data structure comprising business-related data;
   processing said at least one first data structure to create a first indicator of at least the content of said at least one first data structure at a first time;
   encrypting said first indicator to produce an encrypted indicator;
   combining said encrypted indicator and said at least one first data structure to form a second data structure;
   transmitting said second data structure to a second entity;
   authenticating and verifying said second data structure;
   placing a data transfer device in wired or wireless data communication with a device on which said data structure is resident, said data transfer device being adapted to store transaction specific data in encrypted form; and transferring said data structure to said data transfer device;
wherein said act of transferring is performed substantially by a point-of-sale device disposed at a seller's premises, and said data transfer device is adapted for data communication with said point-of-sale device; and
wherein said authenticating and verifying obviate paper or other tangible records of said business-related data.

18. The method of claim 17, wherein said business-related data comprises data related to purchase or service transactions, and said paper or other tangible records comprise receipts of said transactions.

19. The method of claim 18, wherein said authenticating comprises authenticating that the business-related data was created by a designated source, and said verifying comprises verifying that at least a portion of contents of said second data structure are unchanged as compared to corresponding contents of said first data structure.

20. The method of claim 17, further comprising storing said data structure in a data file that is part of one or more independent distributed databases.

21. The method of claim 20, wherein at least a portion of said data file is periodically synchronized with a second data file that is also part of said one or more distributed databases.

22. The method of claim 21, wherein said second data file is located on said data transfer device, and after said synchronization, information in said data file and said second data file are substantially identical.

23. The method of claim 21, wherein conflicts in said synchronization are identified and resolved according to at least one predefined criterion.

24. The method of claim 17, further comprising making said data structure available for use by or transfer to a third party.

25. The method of claim 24, further comprising said third party utilizing said encrypted indicator and said first indicator to authenticate and verify, respectively, at least a portion of said data structure.

\* \* \* \* \*